United States Patent
Jubran et al.

(10) Patent No.: US 7,011,918 B2
(45) Date of Patent: Mar. 14, 2006

(54) POLYMERIC CHARGE TRANSPORT COMPOSITIONS FOR ORGANOPHOTORECEPTORS

(75) Inventors: Nusrallah Jubran, St. Paul, MN (US); Zbigniew Tokarski, Woodbury, MN (US); Kam W. Law, Woodbury, MN (US)

(73) Assignee: Samsung Electronics Co., Ltd., Suwon (KR)

( * ) Notice: Subject to any disclaimer, the term of this patent is extended or adjusted under 35 U.S.C. 154(b) by 176 days.

(21) Appl. No.: 10/789,184

(22) Filed: Feb. 27, 2004

(65) Prior Publication Data

US 2005/0191571 A1    Sep. 1, 2005

(51) Int. Cl.
  G03G 5/00   (2006.01)
  G03G 15/06  (2006.01)
  C07D 327/02 (2006.01)
(52) U.S. Cl. .................... 430/75; 430/77; 430/79; 430/58.05; 430/126; 399/159; 549/1; 549/90
(58) Field of Classification Search ............ 430/75, 430/77, 79, 58.05, 126; 399/159; 549/1, 549/90
See application file for complete search history.

(56) References Cited

U.S. PATENT DOCUMENTS

| | | | |
|---|---|---|---|
| 4,297,426 | A | 10/1981 | Sakai et al. |
| 4,786,571 | A | 11/1988 | Ueda |
| 5,942,615 | A | 8/1999 | Kobayashi et al. |
| 6,066,426 | A | 5/2000 | Mott et al. |
| 6,083,651 | A | 7/2000 | Kobayashi et al. |
| 6,140,004 | A | 10/2000 | Mott et al. |
| 6,214,503 | B1 | 4/2001 | Gaidelis et al. |
| 6,340,548 | B1 | 1/2002 | Jubran et al. |
| 6,670,085 | B1 | 12/2003 | Jubran et al. |
| 6,689,523 | B1 | 2/2004 | Law et al. |
| 6,696,209 | B1 | 2/2004 | Law et al. |
| 2003/0104294 | A1 | 6/2003 | Law et al. |
| 2003/0113132 | A1 | 6/2003 | Law et al. |
| 2003/0113643 | A1 | 6/2003 | Law et al. |
| 2003/0113644 | A1 | 6/2003 | Law et al. |
| 2003/0138712 | A1 | 7/2003 | Law et al. |
| 2003/0198880 | A1 | 10/2003 | Law et al. |
| 2003/0219662 | A1 | 11/2003 | Jubran et al. |

FOREIGN PATENT DOCUMENTS

DE       816923      7/1959

JP   2001-166519   6/2001

OTHER PUBLICATIONS

M. Daskeviciene et el., "Derivatives of 2,5-Dimercapto-1,3,4-thiazole as Hole Transporting Materials," Lithuanian Journal of Physics, 2001, 41, No. 4-6, 521-526.

S.R.Jain et el, "Novel Energetic N-N Bonded Polymeric Binders for Composite Propellants," Macromolecules New Frontiers, p. 1018-1021, Allied Publishers Ltd., New Delhi, 1998.

P.M. Thangamathesvaran and S.R. Jain, "Synthesis, Characterization And Binding Properties Of Epoxy Resins Based On Carbonohydrazones And Thiocarbonohydrazones," *Frontiers of Polymer Research*, p. 589-594, Edited by P.N. Prasad and J.K. Nigam, Plenum Press, NY, 1991.

*Primary Examiner*—Mark A. Chapman
(74) *Attorney, Agent, or Firm*—Patterson, Thuente, Skaar & Christensen, P.A.

(57) ABSTRACT

This invention includes an organophotoreceptor having an electrically conductive substrate and photoconductive element on the electrically conductive substrate, the photoconductive element having a) a polymeric charge transport composition with the formula

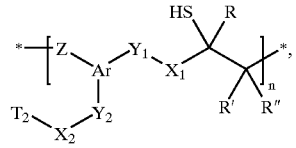

where $Y_1$ and $Y_2$ are, each independently, a bond, a —$CR_1$=N—$NR_2$— group, or a —$CR_3$=N—N=$CR_4$— group;

R, R', R", $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group;

$T_2$ comprises a thiiranyl group, H, an alkyl group, an alkenyl group, or an aromatic group;

Ar comprises an aromatic group;

Z is a bridging group; and n is a distribution of integers between 1 and 100,000 with an average value at least 2; and (b) a charge generating compound.

Corresponding electrophotographic apparatuses and imaging processes are also described.

42 Claims, No Drawings

POLYMERIC CHARGE TRANSPORT COMPOSITIONS FOR ORGANOPHOTORECEPTORS

FIELD OF THE INVENTION

This invention relates to organophotoreceptors suitable for use in electrophotography and, more specifically, to organophotoreceptors having a polymeric charge transport composition comprising a polymer having repeating units, each independently, comprising an aromatic group. Furthermore, the invention further relates to methods for forming an organophotoreceptor with a polymer having repeating units, each independently, comprising an aromatic group.

BACKGROUND OF THE INVENTION

In electrophotography, an organophotoreceptor in the form of a plate, disk, sheet, belt, drum or the like having an electrically insulating photoconductive element on an electrically conductive substrate is imaged by first uniformly electrostatically charging the surface of the photoconductive layer, and then exposing the charged surface to a pattern of light. The light exposure selectively dissipates the charge in the illuminated areas where light strikes the surface, thereby forming a pattern of charged and uncharged areas, referred to as a latent image. A liquid or dry toner is then provided in the vicinity of the latent image, and toner droplets or particles deposit in the vicinity of either the charged or uncharged areas to create a toned image on the surface of the photoconductive layer. The resulting toned image can be transferred to a suitable ultimate or intermediate receiving surface, such as paper, or the photoconductive layer can operate as an ultimate receptor for the image. The imaging process can be repeated many times to complete a single image, for example, by overlaying images of distinct color components or effect shadow images, such as overlaying images of distinct colors to form a full color final image, and/or to reproduce additional images.

Both single layer and multilayer photoconductive elements have been used. In single layer embodiments, a polymeric charge transport composition and charge generating material are combined with a polymeric binder and then deposited on the electrically conductive substrate. In multilayer embodiments, the charge transport material and charge generating material are present in the element in separate layers, each of which can optionally be combined with a polymeric binder, deposited on the electrically conductive substrate. Two arrangements are possible for a two-layer photoconductive element. In one two-layer arrangement (the "dual layer" arrangement), the charge-generating layer is deposited on the electrically conductive substrate and the charge transport layer is deposited on top of the charge generating layer. In an alternate two-layer arrangement (the "inverted dual layer" arrangement), the order of the charge transport layer and charge generating layer is reversed.

In both the single and multilayer photoconductive elements, the purpose of the charge generating material is to generate charge carriers (i.e., holes and/or electrons) upon exposure to light. The purpose of the charge transport material is to accept at least one type of these charge carriers and transport them through the charge transport layer in order to facilitate discharge of a surface charge on the photoconductive element. The charge transport material can be a charge transport compound, an electron transport compound, or a combination of both. When a charge transport compound is used, the charge transport compound accepts the hole carriers and transports them through the layer with the charge transport compound. When an electron transport compound is used, the electron transport compound accepts the electron carriers and transports them through the layer with the electron transport compound.

Charge transport materials may comprise monomeric molecules (e.g., N-ethyl-carbazolo-3-aldehyde-N-methyl-N-phenyl-hydrazone, dimeric molecules (e.g., disclosed in U.S. Pat. Nos. 6,140,004 and 6,670,085), or polymeric compositions (e.g., poly(vinylcarbazole)).

Organophotoreceptors may be used for both dry and liquid electrophotography. There are many differences between dry and liquid electrophotography. A significant difference is that a dry toner is used in dry electrophotography, whereas a liquid toner is used in liquid electrophotography. A potential advantage of liquid electrophotography is that it can provide a higher resolution and thus sharper images than dry electrophotography because liquid toner particles can be generally significantly smaller than dry toner particles. As a result of their smaller size, liquid toners are able to provide images of higher optical density than dry toners.

In both dry and liquid electrophotography, the charge transport material used for the organophotoreceptor should be compatible with the polymeric binder in the photoconductive element. The selection of a suitable polymeric binder for a particular charge transport material can place constraints on the formation of the photoconductive element. If the charge transport material is not compatible with the polymeric binder, the charge transport material may phase-separate or crystallize in the polymeric binder matrix, or may diffuse onto the surface of the layer containing the charge transport material. If such incompatibility occurs, the organophotoreceptor can cease to transport charges.

Furthermore, liquid electrophotography faces an additional issue. In particular, the organophotoreceptor for liquid electrophotography is in contact with the liquid carrier of a liquid toner while the toner dries or pending transfer to a receiving surface. As a result, the charge transport material in the photoconductive element may be removed by extraction by the liquid carrier. Over a long period of operation, the amount of the charge transport material removed by extraction may be significant and, therefore, detrimental to the performance of the organophotoreceptor.

SUMMARY OF THE INVENTION

This invention provides organophotoreceptors having good electrostatic properties such as high $V_{acc}$ and low $V_{dis}$. This invention also provides polymeric charge transport compositions having reduced extraction by liquid carriers and reducing the need for a polymeric binder.

In a first aspect, an organophotoreceptor comprises an electrically conductive substrate and a photoconductive element on the electrically conductive substrate, the photoconductive element comprising a) a polymeric charge transport composition having the formula:

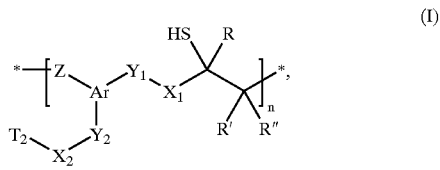

(I)

where $Y_1$ and $Y_2$ are, each independently, a bond, a —$CR_1$=N—$NR_2$— group, or a —$CR_3$=N—N=$CR_4$— group;

R, R', R", $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group, such as a bond or a —$(CH_2)_m$— group, where m is an integer between 1 and 30, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group;

$T_2$ comprises a thiiranyl group, H, an alkyl group, an alkenyl group, or an aromatic group;

Ar comprises an aromatic group;

Z is a bridging group, such as a —$(CH_2)_k$— group, where k is an integer between 1 and 30, inclusive, and one or more of the methylene groups is optionally replaced by O, S, N, C, B, Si, P, C=O, O=S=O, a heterocyclic group, an aromatic group, an $NR_g$ group, a $CR_h$ group, a $CR_iR_j$ group, or a $SiR_kR_l$ where $R_g$, $R_h$, $R_i$, $R_j$, $R_k$, and $R_l$ are, each independently, a bond, H, a hydroxyl group, a thiol group, a carboxyl group, an amino group, an alkyl group, an alkoxy group, an alkenyl group, a heterocyclic group, an aromatic group, or part of a ring group; and n is a distribution of integers between 1 and 100,000 having an average of at least 2; and (b) a charge generating compound.

The organophotoreceptor may be provided in the form of a plate, a flexible belt, a flexible disk, a sheet, a rigid drum, or a sheet around a rigid or compliant drum. In one embodiment, the organophotoreceptor includes: (a) a photoconductive element comprising the polymeric charge transport composition, the charge generating compound, a second charge transport material, and a polymeric binder; and (b) the electrically conductive substrate.

In a second aspect, the invention features an electrophotographic imaging apparatus that includes (a) a light imaging component; and (b) the above-described organophotoreceptor oriented to receive light from the light imaging component. The apparatus preferably further includes a toner dispenser, such as liquid toner dispenser. The method of electrophotographic imaging with photoreceptors containing these novel charge transport compounds is also described.

In a third aspect, the invention features an electrophotographic imaging process that includes (a) applying an electrical charge to a surface of the above-described organophotoreceptor; (b) imagewise exposing the surface of the organophotoreceptor to radiation to dissipate charge in selected areas and thereby form a pattern of at least relatively charged and uncharged areas on the surface; (c) contacting the surface with a toner, such as a liquid toner that includes a dispersion of colorant particles in an organic liquid, to create a toned image; and (d) transferring the toned image to a substrate.

In a fourth aspect, the invention features desirable polymeric charge transport compositions having Formula (I) shown above.

In a fifth aspect, the invention features a charge transport material having the formula:

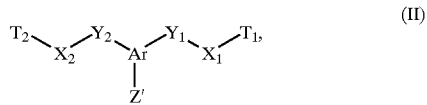

(II)

where $Y_1$ and $Y_2$ are, each independently, a bond, a —$CR_1$=N—$NR_2$— group, or a —$CR_3$=N—N=$CR_4$— group where $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group, such as a bond or a —$(CH_2)_m$— group, where m is an integer between 0 and 20, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group;

$T_1$ comprises a thiiranyl group;

$T_2$ comprises a thiiranyl group, H, an alkyl group, an alkenyl group, or an aromatic group;

Ar comprises an aromatic; and

Z' comprises a reactive functional group that can covalently bond with a thiiranyl group.

In some embodiments, the reactive functional group is selected from the group consisting of a hydroxyl group, a carboxyl group, an amino group, and a thiol group.

In a sixth aspect, the invention features a method for forming a polymeric charge transport composition by polymerizing a charge transport material having Formula (II) above. The polymerization reaction can be initiated, for example, by appropriately adjusting the pH, the temperature, or other appropriate change of conditions.

In a seventh aspect, the invention features a method for forming a polymeric charge transport composition by co-polymerizing a charge transport material having Formula (II) above and an acid anhydride. The co-polymerization reaction can be initiated, for example, by appropriately adjusting the pH, the temperature, the ratio of the two monomers, or other appropriate change of conditions.

These photoreceptors can be used successfully with toners, such as liquid and dry toners, to produce high quality images. The high quality of the imaging system is maintained after repeated cycling.

Other features and advantages of the invention will be apparent from the following description of the preferred embodiments thereof, and from the claims.

DETAILED DESCRIPTION OF PREFERRED EMBODIMENTS

An organophotoreceptor as described herein has an electrically conductive substrate and a photoconductive element comprising a charge generating compound and a polymeric charge transport composition having repeating units comprising at least one aromatic group. These polymeric charge transport compositions can have desirable properties for use within organophotoreceptors for electrophotography. In particular, the polymeric charge transport compositions of this invention can have high charge carrier mobilities and good compatibility with various binder materials, can be incorporated in both the single and multilayer photoconductive elements, and can possess excellent electrophotographic properties. The organophotoreceptors according to this invention generally can have a high photosensitivity, a low residual potential, and a high stability with respect to cycle testing, crystallization, and organophotoreceptor bending and stretching. The organophotoreceptors are particularly useful in laser printers and the like as well as photocopiers, scanners and other electronic devices based on electrophotography. The use of these polymeric charge transport compositions is described in more detail below in the context of laser printer use, although their application in other devices operating by electrophotography can be generalized from the discussion below.

To produce high quality images, particularly after multiple cycles, it is desirable for the charge transport materials to form a homogeneous solution with the polymeric binder and remain approximately homogeneously distributed through the organophotoreceptor material during the cycling of the material. In addition, it is desirable to increase the amount of charge that the charge transport material can accept (indicated by a parameter known as the acceptance voltage or "$V_{acc}$"), and to reduce retention of that charge upon discharge (indicated by a parameter known as the discharge voltage or "$V_{dis}$").

The charge transport materials can be classified as a charge transport compound or an electron transport compound. There are many charge transport compounds and electron transport compounds known in the art for electrophotography. Non-limiting examples of charge transport compounds include, for example, pyrazoline derivatives, fluorene derivatives, oxadiazole derivatives, stilbene derivatives, enamine derivatives, enamine stilbene derivatives, hydrazone derivatives, carbazole hydrazone derivatives, triaryl amines, polyvinyl carbazole, polyvinyl pyrene, polyacenaphthylene, or multi-hydrazone compounds comprising at least two hydrazone groups and at least two groups selected from the group consisting of p-(N,N-disubstituted) arylamine such as triphenylamine and heterocycles such as carbazole, julolidine, phenothiazine, phenazine, phenoxazine, phenoxathiin, thiazole, oxazole, isoxazole, dibenzo (1,4)dioxine, thianthrene, imidazole, benzothiazole, benzotriazole, benzoxazole, benzimidazole, quinoline, isoquinoline, quinoxaline, indole, indazole, pyrrole, purine, pyridine, pyridazine, pyrimidine, pyrazine, triazole, oxadiazole, tetrazole, thiadiazole, benzisoxazole, benzisothiazole, dibenzofuran, dibenzothiophene, thiophene, thianaphthene, quinazoline, or cinnoline.

Generally, an electron transport compound has an electron affinity that is large relative to potential electron traps while yielding an appropriate electron mobility in a composite with a polymer. In some embodiments, the electron transport compound has a reduction potential less than $O_2$. In general, electron transport compositions are easy to reduce and difficult to oxidize while charge transport compounds generally are easy to oxidize and difficult to reduce. In some embodiments, the electron transport compounds have a room temperature, zero field electron mobility of at least about $1 \times 10^{-13}$ cm$^2$/Vs, in further embodiments at least about $1 \times 10^{-10}$ cm$^2$/Vs, in additional embodiments at least about $1 \times 10^{-8}$ cm$^2$/Vs, and in other embodiments at least about $1 \times 10^{-6}$ cm$^2$/Vs. A person of ordinary skill in the art will recognize that other ranges of electron mobility within the explicit ranges are contemplated and are within the present disclosure.

Non-limiting examples of electron transport compounds include, for example, bromoaniline, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-indeno4H-indeno[1,2-b]thiophene-4-one, and 1,3,7-trinitrodibenzo thiophene-5,5-dioxide, (2,3-diphenyl-1-indenylidene)malononitrile, 4H-thiopyran-1,1-dioxide and its derivatives such as 4-dicyanomethylene-2,6-diphenyl-4H-thiopyran-1,1-dioxide, 4-dicyanomethylene-2,6-di-m-tolyl-4H-thiopyran- 1,1-dioxide, and unsymmetrically substituted 2,6-diaryl-4H-thiopyran-1,1-dioxide such as 4H-1,1-dioxo-2-(p-isopropylphenyl)-6-phenyl-4-(dicyanomethylidene)thiopyran and 4H-1,1-dioxo-2-(p-isopropylphenyl)-6-(2-thienyl)-4-(dicyanomethylidene)thiopyran, derivatives of phospha-2,5-cyclohexadiene, alkoxycarbonyl-9-fluorenylidene)malononitrile derivatives such as (4-n-butoxycarbonyl-9-fluorenylidene)malononitrile, (4-phenethoxycarbonyl-9-fluorenylidene)malononitrile, (4-carbitoxy-9-fluorenylidene)malononitrile, and diethyl(4-n-butoxycarbonyl-2,7-dinitro-9-fluorenylidene)-malonate, anthraquinodimethane derivatives such as 11,11,12,12-tetracyano-2-alkylanthraquinodimethane and 11,11-dicyano-12,12-bis(ethoxycarbonyl)anthraquinodimethane, anthrone derivatives such as 1-chloro-10-[bis(ethoxycarbonyl)methylene]anthrone, 1,8-dichloro-10-[bis(ethoxycarbonyl)methylene]anthrone, 1,8-dihydroxy-10-[bis(ethoxycarbonyl)methylene]anthrone, and 1-cyano-10-[bis(ethoxycarbonyl)methylene)anthrone, 7-nitro-2-aza-9-fluroenylidenemalononitrile, diphenoquinone derivatives, benzoquinone derivatives, naphtoquinone derivatives, quinine derivatives, tetracyanoethylenecyanoethylene, 2,4,8-trinitrothioxantone, dinitrobenzene derivatives, dinitroanthracene derivatives, dinitroacridine derivatives, nitroanthraquinone derivatives, dinitroanthraquinone derivatives, succinic anhydride, maleic anhydride, dibromomaleic anhydride, pyrene derivatives, carbazole derivatives, hydrazone derivatives, N,N-dialkylaniline derivatives, diphenylamine derivatives, triphenylamine derivatives, triphenylmethane derivatives, tetracyanoquinodimethane, 2,4,5,7-tetranitro-9-fluorenone, 2,4,7-trinitro-9-dicyanomethylenefluorenone, 2,4,5,7-tetranitroxanthone derivatives, and 2,4,8-trinitrothioxanthone derivatives. In some embodiments of interest, the electron transport compound comprises an (alkoxycarbonyl-9-fluorenylidene)malononitrile derivative, such as (4-n-butoxycarbonyl-9-fluorenylidene) malononitrile.

Although there are many charge transport materials available, there is a need for other charge transport materials to meet the various requirements of particular electrophotography applications.

In electrophotography applications, a charge-generating compound within an organophotoreceptor absorbs light to form electron-hole pairs. These electrons and holes can be transported over an appropriate time frame under a large electric field to discharge locally a surface charge that is generating the field. The discharge of the field at a particular location results in a surface charge pattern that essentially matches the pattern drawn with the light. This charge pattern then can be used to guide toner deposition. The charge transport materials described herein can be effective at transporting charge, holes and/or electrons, from the electron-hole pairs formed by the charge generating compound. In some embodiments, a specific electron transport compound or charge transport compound can also be used along with the charge transport material of this invention.

The layer or layers of materials containing the charge generating compound and the charge transport materials are within an organophotoreceptor. To print a two dimensional image using the organophotoreceptor, the organophotoreceptor has a two dimensional surface for forming at least a portion of the image. The imaging process then continues by cycling the organophotoreceptor to complete the formation of the entire image and/or for the processing of subsequent images.

The organophotoreceptor may be provided in the form of a plate, a flexible belt, a disk, a rigid drum, a sheet around a rigid or compliant drum, or the like. The charge transport material can be in the same layer as the charge generating compound and/or in a different layer from the charge generating compound. Additional layers can be used also, as described further below.

In some embodiments, the organophotoreceptor material comprises, for example: (a) a charge transport layer comprising the polymeric charge transport composition and a polymeric binder; (b) a charge generating layer comprising the charge generating compound and a polymeric binder; and (c) the electrically conductive substrate. The charge transport layer may be intermediate between the charge generating layer and the electrically conductive substrate. Alternatively, the charge generating layer may be intermediate between the charge transport layer and the electrically conductive substrate. In further embodiments, the organophotoreceptor material has a single layer with both a charge transport material and a charge generating compound within a polymeric binder.

The organophotoreceptors can be incorporated into an electrophotographic imaging apparatus, such as laser printers. In these devices, an image is formed from physical embodiments and converted to a light image that is scanned onto the organophotoreceptor to form a surface latent image. The surface latent image can be used to attract toner onto the surface of the organophotoreceptor, in which the toner image is the same or the negative of the light image projected onto the organophotoreceptor. The toner can be a liquid toner or a dry toner. The toner is subsequently transferred, from the surface of the organophotoreceptor, to a receiving surface, such as a sheet of paper. After the transfer of the toner, the entire surface is discharged, and the material is ready to cycle again. The imaging apparatus can further comprise, for example, a plurality of support rollers for transporting a paper receiving medium and/or for movement of the photoreceptor, a light imaging component with suitable optics to form the light image, a light source, such as a laser, a toner source and delivery system and an appropriate control system.

An electrophotographic imaging process generally can comprise (a) applying an electrical charge to a surface of the above-described organophotoreceptor; (b) imagewise exposing the surface of the organophotoreceptor to radiation to dissipate charge in selected areas and thereby form a pattern of charged and uncharged areas on the surface; (c) exposing the surface with a toner, such as a liquid toner that includes a dispersion of colorant particles in an organic liquid to create a toner image, to attract toner to the charged or discharged regions of the organophotoreceptor; and (d) transferring the toner image to a substrate.

The polymeric charge transport compositions can be formed from polymerization of the monomers having Formula (II) below and subsequent incorporation into an organophotoreceptor, which can involve combination with a binder and/or other elements of a layer of an organophotoreceptor. Furthermore, the compounds of Formula (II) can be used directly as a charge transport material. Charge transport materials with a similar Formula to the compounds of Formula (II) without the Z' reactive functional group are described further in copending U.S. patent application Ser. No. 10/749,178 to Tokarski, et al., entitled "ORGANOPHOTORECEPTOR WITH CHARGE TRANSPORT MATERIAL HAVING A THIIRANYL GROUP," incorporated herein by reference. However, the polymerized charge transport material has the advantage of generally resisting extraction from a resulting photoreceptor. The monomer units have a thiiranyl group and at least one reactive functional group that can react with the thiiranyl group. In some embodiments, the reactive functional group contains an active hydrogen for binding with the thiiranyl group. The monomer compound can be represented with the following formula:

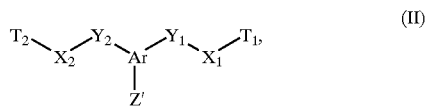

(II)

where $Y_1$ and $Y_2$ are, each independently, a bond, a $-CR_1=N-NR_2-$ group, or a $-CR_3=N-N=CR_4-$ group where $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group, such as a bond or a $-(CH_2)_m-$ group, where m is an integer between 0 and 20, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group;

$T_1$ comprises a thiiranyl group;

$T_2$ comprises a thiiranyl group, H, an alkyl group, an alkenyl group, or an aromatic group;

Ar comprises an aromatic group; and

Z' comprises a reactive functional group that can covalently bond with a thiiranyl group.

Due to the presence of the thiiranyl group and the reactive Z' group, the monomer compound of Formula (II) can polymerize under appropriate conditions. Nevertheless, the polymerization can be mediated by a further polyfunctional (e.g., bifunctional) bridging compound that can further react with the thiiranyl group and/or the Z' group. Suitable polyfunctional bridging compounds are described further below.

The monomer can be polymerized under appropriate conditions to form a polymeric charge transport composition. The polymeric charge transport composition can be represented by the following formula:

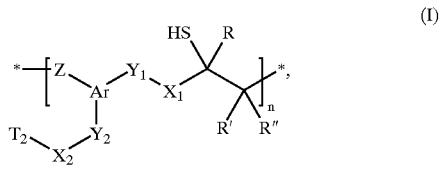

(I)

where $Y_1$ and $Y_2$ are, each independently, a bond, a —$CR_1$=N—$NR_2$— group, or a —$CR_3$=N—N=$CR_4$— group;

R, R', R", $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group, such as a bond or a —$(CH_2)_m$— group, where m is an integer between 1 and 30, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group;

$T_2$ comprises a thiiranyl group, H, an alkyl group, an alkenyl group, or an aromatic group;

Ar comprises an aromatic group;

Z is a bridging group, such as a —$(CH_2)_k$— group, where k is an integer between 1 and 30, inclusive, and one or more of the methylene groups is optionally replaced by O, S, N, C, B, Si, P, C=O, O=S=O, a heterocyclic group, an aromatic group, an $NR_g$ group, a $CR_h$ group, a $CR_iR_j$ group, or a $SiR_kR_l$ where $R_g$, $R_h$, $R_i$, $R_j$, $R_k$, and $R_l$ are, each independently, a bond, H, a hydroxyl group, a thiol group, a carboxyl group, an amino group, an alkyl group, an alkoxy group, an alkenyl group, a heterocyclic group, an aromatic group, or part of a ring group; and n is a distribution of integers between 1 and 100,000 with an average of at least 2.

The asterisks (*) indicate terminal groups on the polymer, which may vary between different polymer molecules depending on the state of the particular polymerization process at the end of the polymerization step.

A heterocyclic group includes any monocyclic or polycyclic (e.g., bicyclic, tricyclic, etc.) ring compound having at least a heteroatom (e.g., O, S, N, P, B, Si, etc.) in the ring.

An aromatic group can be any conjugated ring system containing 4n+2 pi-electrons. There are many criteria available for determining aromaticity. A widely employed criterion for the quantitative assessment of aromaticity is the resonance energy. Specifically, an aromatic group has a resonance energy. In some embodiments, the resonance energy of the aromatic group is at least 10 KJ/mol. In further embodiments, the resonance energy of the aromatic group is greater than 0.1 KJ/mol. Aromatic groups may be classified as an aromatic heterocyclic group which contains at least a heteroatom in the 4n+2 pi-electron ring, or as an aryl group which does not contain a heteroatom in the 4n+2 pi-electron ring. The aromatic group may comprise a combination of aromatic heterocyclic group and aryl group. Nonetheless, either the aromatic heterocyclic or the aryl group may have at least one heteroatom in a substituent attached to the 4n+2 pi-electron ring. Furthermore, either the aromatic heterocyclic or the aryl group may comprise a monocyclic or polycyclic (such as bicyclic, tricyclic, etc.) ring.

Non-limiting examples of the aromatic heterocyclic group are furanyl, thiophenyl, pyrrolyl, indolyl, carbazolyl, benzofuranyl, benzothiophenyl, dibenzofuranyl, dibenzothiophenyl, pyridinyl, pyridazinyl, pyrimidinyl, pyrazinyl, triazinyl, tetrazinyl, petazinyl, quinolinyl, isoquinolinyl, cinnolinyl, phthalazinyl, quinazolinyl, quinoxalinyl, naphthyridinyl, pteridinyl, acridinyl, phenanthridinyl, phenanthrolinyl, anthyridinyl, purinyl, pteridinyl, alloxazinyl, phenazinyl, phenothiazinyl, phenoxazinyl, phenoxathiinyl, dibenzo(1,4)dioxinyl, thianthrenyl, and a combination thereof. The aromatic heterocyclic group may also include any combination of the above aromatic heterocyclic groups bonded together either by a bond (as in bicarbazolyl) or by a linking group (as in 1,6 di(10H-10-phenothiazinyl)hexane). The linking group may include an aliphatic group, an aromatic group, a heterocyclic group, or a combination thereof. Furthermore, either an aliphatic group or an aromatic group within a linking group may comprise at least one heteroatom such as O, S, and N. Non-limiting examples of the aryl group are phenyl, naphthyl, benzyl, or tolanyl group, sexiphenylene, phenanthrenyl, anthracenyl, coronenyl, and tolanylphenyl. The aryl group may also include any combination of the above aryl groups bonded together either by a bond (as in biphenyl group) or a linking group (as in stilbenyl, diphenyl sulfone, an arylamine group). The linking group may include an aliphatic group, an aromatic group, a heterocyclic group, or a combination thereof. Furthermore, either an aliphatic group or an aromatic group within a linking group may comprise at least one heteroatom such as O, S, and N.

With respect to the Ar aromatic group, various aromatic groups have been found to be particularly useful in the formation of the charge transport materials described herein. Non-limiting examples of useful aromatic groups for this invention include arylamine groups, such as a carbazole group, a bicarbazole group, a julolidine group, and a p-(N, N-disubstituted)aryl amine group (e.g., a bis[(N,N-disubstituted)amino]aromatic group and triaryl amines); aromatic heterocyclic groups, such as a phenazinyl group, a phenothiazinyl group, a phenoxazinyl group, a phenoxathiinyl group, a dibenzo(1,4)dioxinyl group, and a thianthrenyl group; and aryl groups, such as a phenyl group, a naphthyl group, and a stilbenyl group.

Substitution is liberally allowed on the chemical groups to affect various physical effects on the properties of the compounds, such as mobility, sensitivity, solubility, stability, and the like, as is known generally in the art. In the description of chemical substituents, there are certain practices common to the art that are reflected in the use of language. The term group indicates that the generically recited chemical entity (e.g., alkyl group, phenyl group, julolidine group, carbazole group, (N,N-disubstituted)arylamine group, bicarbazole group, heterocyclic group, etc.) may have any substituent thereon which is consistent with the bond structure of that group. For example, where the term 'alkyl group' is used, that term would not only include unsubstituted linear, branched and cyclic alkyls, such as methyl, ethyl, isopropyl, tert-butyl, cyclohexyl, dodecyl and the like, but also substituents having heteroatom, such as 3-ethoxylpropyl, 4-(N,N-diethylamino)butyl, 3-hydroxypentyl, 2-thiolhexyl, 1,2,3-tribromoopropyl, and the like, and aromatic group, such as phenyl, naphthyl, carbazolyl, pyrrole, and the like. However, as is consistent with such nomenclature, no substitution would be included within the term that would alter the fundamental bond structure of the underlying group. For example, where a phenyl group is recited, substitution such as 2- or 4-aminophenyl, 2- or 4-(N,N-disubstituted)aminophenyl, 2,4-dihydroxyphenyl, 2,4,6-trithiophenyl, 2,4,6-trimethoxyphenyl and the like would be acceptable within the terminology, while substitution of 1,1,2,2,3,3-hexamethylphenyl would not be acceptable as that substitution would require the ring bond structure of the phenyl group to be altered to a non-aromatic form. Similarly, when referring to a thiiranyl group, the compound or substituent cited includes any substitution that does not substantively alter the chemical nature of the thiiranyl ring in the formula. Where the term moiety is used, such as alkyl moiety or phenyl moiety, that terminology indicates that the chemical material is not substituted. Where the term alkyl moiety is used, that term represents only an unsubstituted alkyl hydrocarbon group, whether branched, straight chain, or cyclic.

Organophotoreceptors

The organophotoreceptor may be, for example, in the form of a plate, a sheet, a flexible belt, a disk, a rigid drum, or a sheet around a rigid or compliant drum, with flexible belts and rigid drums generally being used in commercial embodiments. The organophotoreceptor may comprise, for example, an electrically conductive substrate and on the electrically conductive substrate a photoconductive element in the form of one or more layers. The photoconductive element can comprise both a charge transport material and a charge generating compound in a polymeric binder, which may or may not be in the same layer, as well as a second charge transport material such as a charge transport compound or an electron transport compound in some embodiments. For example, the charge transport material and the charge generating compound can be in a single layer. In other embodiments, however, the photoconductive element comprises a bilayer construction featuring a charge generating layer and a separate charge transport layer. The charge generating layer may be located intermediate between the electrically conductive substrate and the charge transport layer. Alternatively, the photoconductive element may have a structure in which the charge transport layer is intermediate between the electrically conductive substrate and the charge generating layer.

The electrically conductive substrate may be flexible, for example in the form of a flexible web or a belt, or inflexible, for example in the form of a drum. A drum can have a hollow cylindrical structure that provides for attachment of the drum to a drive that rotates the drum during the imaging process. Typically, a flexible electrically conductive substrate comprises an electrically insulating substrate and a thin layer of electrically conductive material onto which the photoconductive material is applied.

The electrically insulating substrate may be paper or a film forming polymer such as polyester (e.g., polyethylene terephthalate or polyethylene naphthalate), polyimide, polysulfone, polypropylene, nylon, polyester, polycarbonate, polyvinyl resin, polyvinyl fluoride, polystyrene and the like. Specific examples of polymers for supporting substrates included, for example, polyethersulfone (STABAR™ S-100, available from ICI), polyvinyl fluoride (Tedlar®, available from E.I. DuPont de Nemours & Company), polybisphenol-A polycarbonate (MAKROFOL™, available from Mobay Chemical Company) and amorphous polyethylene terephthalate (MELINAR™, available from ICI Americas, Inc.). The electrically conductive materials may be graphite, dispersed carbon black, iodine, conductive polymers such as polypyrroles and Calgon® conductive polymer 261 (commercially available from Calgon Corporation, Inc., Pittsburgh, Pa.), metals such as aluminum, titanium, chromium, brass, gold, copper, palladium, nickel, or stainless steel, or metal oxide such as tin oxide or indium oxide. In embodiments of particular interest, the electrically conductive material is aluminum. Generally, the photoconductor substrate has a thickness adequate to provide the required mechanical stability. For example, flexible web substrates generally have a thickness from about 0.01 to about 1 mm, while drum substrates generally have a thickness from about 0.5 mm to about 2 mm.

The charge generating compound is a material that is capable of absorbing light to generate charge carriers, such as a dye or pigment. Non-limiting examples of suitable charge generating compounds include, for example, metal-free phthalocyanines (e.g., ELA 8034 metal-free phthalocyanine available from H.W. Sands, Inc. or Sanyo Color Works, Ltd., CGM-X01), metal phthalocyanines such as titanium phthalocyanine, copper phthalocyanine, oxytitanium phthalocyanine (also referred to as titanyl oxyphthalocyanine, and including any crystalline phase or mixtures of crystalline phases that can act as a charge generating compound), hydroxygallium phthalocyanine, squarylium dyes and pigments, hydroxy-substituted squarylium pigments, perylimides, polynuclear quinones available from Allied Chemical Corporation under the trade name INDOFAST™ Double Scarlet, INDOFAST™ Violet Lake B, INDOFAST™ Brilliant Scarlet and INDOFAST™ Orange, quinacridones available from DuPont under the trade name MONASTRAL™ Red, MONASTRAL™ Violet and MONASTRAL™ Red Y, naphthalene 1,4,5,8-tetracarboxylic acid derived pigments including the perinones, tetrabenzoporphyrins and tetranaphthaloporphyrins, indigo- and thioindigo dyes, benzothioxanthene-derivatives, perylene 3,4,9,10-tetracarboxylic acid derived pigments, polyazo-pigments including bisazo-, trisazo- and tetrakisazo-pigments, polymethine dyes, dyes containing quinazoline groups, tertiary amines, amorphous selenium, selenium alloys such as selenium-tellurium, selenium-tellurium-arsenic and selenium-arsenic, cadmium sulphoselenide, cadmium selenide, cadmium sulphide, and mixtures thereof. For some embodiments, the charge generating compound comprises oxytitanium phthalocyanine (e.g., any phase thereof), hydroxygallium phthalocyanine or a combination thereof.

The photoconductive layer of this invention may optionally contain a second charge transport material which may be a charge transport compound, an electron transport compound, or a combination of both. Generally, any charge transport compound or electron transport compound known in the art can be used as the second charge transport material.

An electron transport compound and a UV light stabilizer can have a synergistic relationship for providing desired electron flow within the photoconductor. The presence of the UV light stabilizers alters the electron transport properties of the electron transport compounds to improve the electron transporting properties of the composite. UV light stabilizers can be ultraviolet light absorbers or ultraviolet light inhibitors that trap free radicals.

UV light absorbers can absorb ultraviolet radiation and dissipate it as heat. UV light inhibitors are thought to trap free radicals generated by the ultraviolet light and after trapping of the free radicals, subsequently to regenerate active stabilizer moieties with energy dissipation. In view of the synergistic relationship of the UV stabilizers with electron transport compounds, the particular advantages of the UV stabilizers may not be their UV stabilizing abilities, although the UV stabilizing ability may be further advantageous in reducing degradation of the organophotoreceptor over time. The improved synergistic performance of organophotoreceptors with layers comprising both an electron transport compound and a UV stabilizer are described further in copending U.S. patent application Ser. No. 10/425, 333 filed on Apr. 28, 2003 to Zhu, entitled "Organophotoreceptor With A Light Stabilizer," incorporated herein by reference.

Non-limiting examples of suitable light stabilizer include, for example, hindered trialkylamines such as Tinuvin 144 and Tinuvin 292 (from Ciba Specialty Chemicals, Terrytown, N.Y.), hindered alkoxydialkylamines such as Tinuvin 123 (from Ciba Specialty Chemicals), benzotriazoles such as Tinuvan 328, Tinuvin 900 and Tinuvin 928 (from Ciba Specialty Chemicals), benzophenones such as Sanduvor 3041 (from Clariant Corp., Charlotte, N.C.), nickel compounds such as Arbestab (from Robinson Brothers Ltd, West Midlands, Great Britain), salicylates, cyanocinnamates, benzylidene malonates, benzoates, oxanilides such as Sanduvor VSU (from Clariant Corp., Charlotte, N.C.), triazines such as Cyagard UV-1164 (from Cytec Industries Inc., N.J.), polymeric sterically hindered amines such as Luchem (from Atochem North America, Buffalo, N.Y.). In some embodiments, the light stabilizer is selected from the group consisting of hindered trialkylamines having the following formula:

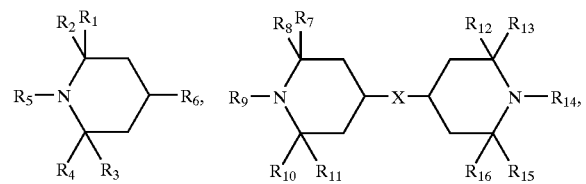

where $R_1$, $R_2$, $R_3$, $R_4$, $R_6$, $R_7$, $R_8$, $R_{10}$, $R_{11}$, $R_{12}$, $R_{13}$, $R_{14}$, $R_{15}$ are, each independently, hydrogen, alkyl group, or ester, or ether group; and $R_5$, $R_9$, and $R_{14}$ are, each independently, alkyl group; and X is a linking group selected from the group consisting of —O—CO—$(CH_2)_m$—CO—O— where m is between 2 to 20.

The binder generally is capable of dispersing or dissolving the charge transport material (in the case of the charge transport layer or a single layer construction), the charge generating compound (in the case of the charge generating layer or a single layer construction) and/or an electron transport compound for appropriate embodiments. Examples of suitable binders for both the charge generating layer and charge transport layer generally include, for example, polystyrene-co-butadiene, polystyrene-co-acrylonitrile, modified acrylic polymers, polyvinyl acetate, styrene-alkyd resins, soya-alkyl resins, polyvinylchloride, polyvinylidene chloride, polyacrylonitrile, polycarbonates, polyacrylic acid, polyacrylates, polymethacrylates, styrene polymers, polyvinyl butyral, alkyd resins, polyamides, polyurethanes, polyesters, polysulfones, polyethers, polyketones, phenoxy resins, epoxy resins, silicone resins, polysiloxanes, poly(hydroxyether) resins, polyhydroxystyrene resins, novolak, poly(phenylglycidyl ether)-co-dicyclopentadiene, copolymers of monomers used in the above-mentioned polymers, and combinations thereof. Specific suitable binders include, for example, polyvinyl butyral, polycarbonate, and polyester. Non-limiting examples of polyvinyl butyral include BX-1 and BX-5 from Sekisui Chemical Co. Ltd., Japan. Non-limiting examples of suitable polycarbonate include polycarbonate A which is derived from bisphenol-A (e.g. Iupilon-A from Mitsubishi Engineering Plastics, or Lexan 145 from General Electric); polycarbonate Z which is derived from cyclohexylidene bisphenol (e.g. Iupilon-Z from Mitsubishi Engineering Plastics Corp, White Plain, N.Y.); and polycarbonate C which is derived from methylbisphenol A (from Mitsubishi Chemical Corporation). Non-limiting examples of suitable polyester binders include ortho-polyethylene terephthalate (e.g. OPET TR-4 from Kanebo Ltd., Yamaguchi, Japan).

Suitable optional additives for any one or more of the layers include, for example, antioxidants, coupling agents, dispersing agents, curing agents, surfactants, and combinations thereof.

The photoconductive element overall typically has a thickness from about 10 microns to about 45 microns. In the dual layer embodiments having a separate charge generating layer and a separate charge transport layer, charge generation layer generally has a thickness form about 0.5 microns to about 2 microns, and the charge transport layer has a thickness from about 5 microns to about 35 microns. In embodiments in which the charge transport material and the charge generating compound are in the same layer, the layer with the charge generating compound and the polymeric charge transport composition generally has a thickness from about 7 microns to about 30 microns. In embodiments with a distinct electron transport layer, the electron transport layer has an average thickness from about 0.5 microns to about 10 microns and in further embodiments from about 1 micron to about 3 microns. In general, an electron transport overcoat layer can increase mechanical abrasion resistance, increases resistance to carrier liquid and atmospheric moisture, and decreases degradation of the photoreceptor by corona gases. A person of ordinary skill in the art will recognize that additional ranges of thickness within the explicit ranges above are contemplated and are within the present disclosure.

Generally, for the organophotoreceptors described herein, the charge generation compound is in an amount from about 0.5 to about 25 weight percent, in further embodiments in an amount from about 1 to about 15 weight percent, and in other embodiments in an amount from about 2 to about 10 weight percent, based on the weight of the photoconductive layer. The charge transport material is in an amount from about 10 to about 80 weight percent, based on the weight of the photoconductive layer, in further embodiments in an amount from about 35 to about 60 weight percent, and in other embodiments from about 45 to about 55 weight percent, based on the weight of the photoconductive layer. The optional second charge transport material, when present, can be in an amount of at least about 2 weight percent, in other embodiments from about 2.5 to about 25 weight percent, based on the weight of the photoconductive layer, and in further embodiments in an amount from about 4 to about 20 weight percent, based on the weight of the photoconductive layer. The binder is in an amount from about 15 to about 80 weight percent, based on the weight of the photoconductive layer, and in further embodiments in an amount from about 20 to about 75 weight percent, based on the weight of the photoconductive layer. A person of ordinary skill in the art will recognize that additional ranges within the explicit ranges of compositions are contemplated and are within the present disclosure.

For the dual layer embodiments with a separate charge generating layer and a charge transport layer, the charge generation layer generally comprises a binder in an amount from about 10 to about 90 weight percent, in further embodiments from about 15 to about 80 weight percent and in some embodiments in an amount from about 20 to about 75 weight percent, based on the weight of the charge generation layer. The optional charge transport material in the charge generating layer, if present, generally can be in an amount of at least about 2.5 weight percent, in further embodiments from about 4 to about 30 weight percent and in other embodiments in an amount from about 10 to about 25 weight percent, based on the weight of the charge generating layer. The charge transport layer generally comprises a binder in an amount from about 20 weight percent to about 70 weight percent and in further embodiments in an amount from about 30 weight percent to about 50 weight percent. A person of ordinary skill in the art will recognize that additional ranges of binder concentrations for the dual layer embodiments within the explicit ranges above are contemplated and are within the present disclosure.

For the embodiments with a single layer having a charge generating compound and a charge transport material, the photoconductive layer generally comprises a binder, a charge transport material, and a charge generation compound. The charge generation compound can be in an amount from about 0.05 to about 25 weight percent and in further embodiment in an amount from about 2 to about 15 weight percent, based on the weight of the photoconductive layer. The charge transport material can be in an amount from about 10 to about 80 weight percent, in other embodiments from about 25 to about 65 weight percent, in additional embodiments from about 30 to about 60 weight percent and in further embodiments in an amount from about 35 to about 55 weight percent, based on the weight of the photoconductive layer, with the remainder of the photoconductive layer comprising the binder, and optional additives, such as any conventional additives. A single layer with a polymeric charge transport composition and a charge generating compound generally comprises a binder in an amount from about 10 weight percent to about 75 weight percent, in other embodiments from about 20 weight percent to about 60 weight percent, and in further embodiments from about 25 weight percent to about 50 weight percent. Optionally, the layer with the charge generating compound and the charge transport material may comprise a second charge transport material. The optional second charge transport material, if present, generally can be in an amount of at least about 2.5 weight percent, in further embodiments from about 4 to about 30 weight percent and in other embodiments in an amount from about 10 to about 25 weight percent, based on the weight of the photoconductive layer. A person of ordinary skill in the art will recognize that additional composition ranges within the explicit compositions ranges for the layers above are contemplated and are within the present disclosure.

In general, any layer with an electron transport compound can advantageously further include a UV light stabilizer. In particular, the electron transport layer generally can comprise an electron transport compound, a binder, and an optional UV light stabilizer. An overcoat layer comprising an electron transport compound is described further in copending U.S. patent application Ser. No. 10/396,536 to Zhu et al. entitled, "Organophotoreceptor With An Electron Transport Layer," incorporated herein by reference. For example, an electron transport compound as described above may be used in the release layer of the photoconductors described herein. The electron transport compound in an electron transport layer can be in an amount from about 10 to about 50 weight percent, and in other embodiments in an amount from about 20 to about 40 weight percent, based on the weight of the electron transport layer. A person of ordinary skill in the art will recognize that additional ranges of compositions within the explicit ranges are contemplated and are within the present disclosure.

The UV light stabilizer, if present, in any one or more appropriate layers of the photoconductor generally is in an amount from about 0.5 to about 25 weight percent and in some embodiments in an amount from about 1 to about 10 weight percent, based on the weight of the particular layer. A person of ordinary skill in the art will recognize that additional ranges of compositions within the explicit ranges are contemplated and are within the present disclosure.

For example, the photoconductive layer may be formed by dispersing or dissolving the components, such as one or more of a charge generating compound, the polymeric charge transport composition of this invention, a second charge transport material such as a charge transport compound or an electron transport compound, a UV light stabilizer, and a polymeric binder in organic solvent, coating the dispersion and/or solution on the respective underlying layer and drying the coating. In particular, the components can be dispersed by high shear homogenization, ball-milling, attritor milling, high energy bead (sand) milling or other size reduction processes or mixing means known in the art for effecting particle size reduction in forming a dispersion.

The photoreceptor may optionally have one or more additional layers as well. An additional layer can be, for example, a sub-layer or an overcoat layer, such as a barrier layer, a release layer, a protective layer, or an adhesive layer. A release layer or a protective layer may form the uppermost layer of the photoconductor element. A barrier layer may be sandwiched between the release layer and the photoconductive element or used to overcoat the photoconductive element. The barrier layer provides protection from abrasion to the underlayers. An adhesive layer locates and improves the adhesion between a photoconductive element, a barrier layer and a release layer, or any combination thereof. A sub-layer is a charge blocking layer and locates between the electrically conductive substrate and the photoconductive element. The sub-layer may also improve the adhesion between the electrically conductive substrate and the photoconductive element.

Suitable barrier layers include, for example, coatings such as crosslinkable siloxanol-colloidal silica coating and hydroxylated silsesquioxane-colloidal silica coating, and organic binders such as polyvinyl alcohol, methyl vinyl ether/maleic anhydride copolymer, casein, polyvinyl pyrrolidone, polyacrylic acid, gelatin, starch, polyurethanes, polyimides, polyesters, polyamides, polyvinyl acetate, polyvinyl chloride, polyvinylidene chloride, polycarbonates, polyvinyl butyral, polyvinyl acetoacetal, polyvinyl formal, polyacrylonitrile, polymethyl methacrylate, polyacrylates, polyvinyl carbazoles, copolymers of monomers used in the above-mentioned polymers, vinyl chloride/vinyl acetate/vinyl alcohol terpolymers, vinyl chloride/vinyl acetate/maleic acid terpolymers, ethylene/vinyl acetate copolymers, vinyl chloride/vinylidene chloride copolymers, cellulose polymers, and mixtures thereof. The above barrier layer polymers optionally may contain small inorganic particles such as fumed silica, silica, titania, alumina, zirconia, or a combination thereof. Barrier layers are described further in U.S. Pat. No. 6,001,522 to Woo et al., entitled "Barrier Layer For Photoconductor Elements Comprising An Organic Polymer And Silica," incorporated herein by reference. The release layer topcoat may comprise any release layer composition known in the art. In some embodiments, the release layer is a fluorinated polymer, siloxane polymer, fluorosilicone polymer, silane, polyethylene, polypropylene, polyacrylate, or a combination thereof. The release layers can comprise crosslinked polymers.

The release layer may comprise, for example, any release layer composition known in the art. In some embodiments, the release layer comprises a fluorinated polymer, siloxane polymer, fluorosilicone polymer, polysilane, polyethylene, polypropylene, polyacrylate, poly(methyl methacrylate-co-methacrylic acid), urethane resins, urethane-epoxy resins, acrylated-urethane resins, urethane-acrylic resins, or a combination thereof. In further embodiments, the release layers comprise crosslinked polymers.

The protective layer can protect the organophotoreceptor from chemical and mechanical degradation. The protective layer may comprise any protective layer composition known in the art. In some embodiments, the protective layer is a fluorinated polymer, siloxane polymer, fluorosilicone polymer, polysilane, polyethylene, polypropylene, polyacrylate, poly(methyl methacrylate-co-methacrylic acid), urethane resins, urethane-epoxy resins, acrylated-urethane resins, urethane-acrylic resins, or a combination thereof. In some embodiments of particular interest, the release layers are crosslinked polymers.

An overcoat layer may comprise an electron transport compound as described further in copending U.S. patent application Ser. No. 10/396,536, filed on Mar. 25, 2003 to Zhu et al. entitled, "Organoreceptor With An Electron Transport Layer," incorporated herein by reference. For example, an electron transport compound, as described above, may be used in the release layer of this invention. The electron transport compound in the overcoat layer can be in an amount from about 2 to about 50 weight percent, and in other embodiments in an amount from about 10 to about 40 weight percent, based on the weight of the release layer. A person of ordinary skill in the art will recognize that additional ranges of composition within the explicit ranges are contemplated and are within the present disclosure.

Generally, adhesive layers comprise a film forming polymer, such as polyester, polyvinylbutyral, polyvinylpyrrolidone, polyurethane, polymethyl methacrylate, poly(hydroxy amino ether) and the like. Barrier and adhesive layers are described further in U.S. Pat. No. 6,180,305 to Ackley et al., entitled "Organic Photoreceptors for Liquid Electrophotography," incorporated herein by reference.

Sub-layers can comprise, for example, polyvinylbutyral, organosilanes, hydrolyzable silanes, epoxy resins, polyesters, polyamides, polyurethanes, cellulosics, and the like. In some embodiments, the sub-layer has a dry thickness between about 20 Angstroms and about 20,000 Angstroms. Sublayers containing metal oxide conductive particles can be between about 1 and about 25 microns thick. A person of ordinary skill in the art will recognize that additional ranges of compositions and thickness within the explicit ranges are contemplated and are within the present disclosure.

The polymeric charge transport compositions as described herein, and photoreceptors including these compounds, are suitable for use in an imaging process with either dry or liquid toner development. For example, any dry toners and liquid toners known in the art may be used in the process and the apparatus of this invention. Liquid toner development can be desirable because it offers the advantages of providing higher resolution images and requiring lower energy for image fixing compared to dry toners. Examples of suitable liquid toners are known in the art. Liquid toners generally comprise toner particles dispersed in a carrier liquid. The toner particles can comprise a colorant/pigment, a resin binder, and/or a charge director. In some embodiments of liquid toner, a resin to pigment ratio can be from 1:1 to 10:1, and in other embodiments, from 4:1 to 8:1. Liquid toners are described further in Published U.S. Patent Applications 2002/0128349, entitled "Liquid Inks Comprising A Stable Organosol," and 2002/0086916, entitled "Liquid Inks Comprising Treated Colorant Particles," and U.S. Pat. No. 6,649,316, entitled "Phase Change Developer For Liquid Electrophotography," all three of which are incorporated herein by reference.

Charge Transport Composition

The organophotoreceptor described herein comprise a polymeric charge transport composition having the formula:

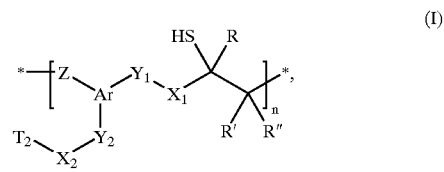

(I)

where $Y_1$ and $Y_2$ are, each independently, a bond, a —$CR_1$=N—$NR_2$— group, or a —$CR_3$=N—N=$CR_4$— group;

R, R', R", $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group, such as a bond or a —$(CH_2)_m$— group, where m is an integer between 1 and 30, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or a part of a ring group;

$T_2$ comprises a thiiranyl group, H, an alkyl group, an alkenyl group, or an aromatic group;

Ar comprises an aromatic group;

Z is a bridging group, such as a —$(CH_2)_k$— group, where k is an integer between 1 and 30, inclusive, and one or more of the methylene groups is optionally replaced by O, S, N, C, B, Si, P, C=O, O=S=O, a heterocyclic group, an aromatic group, an $NR_g$ group, a $CR_h$ group, a $CR_iR_j$ group, or a $SiR_kR_l$ where $R_g$, $R_h$, $R_i$, $R_j$, $R_k$, and $R_l$ are, each independently, a bond, H, a hydroxyl group, a thiol group, a carboxyl group, an amino group, an alkyl group, an alkoxy group, an alkenyl group, a heterocyclic group, an aromatic group, or a part of a ring group; and n is a distribution of integers between 1 and 100,000 with the average value of n being at least 2.

In general, the distribution of n values depends on the polymerization conditions. The presence of the polymer of Formula (I) does not preclude the presence of unreacted monomer and dimers within the organophotoreceptor, although the concentrations of monomers and dimers would generally be small if not extremely small or undetectable. The extent of polymerization, as specified with n, can affect the properties of the resulting polymer. In some embodiments, an average n value can be in the hundreds or thousands, although the average n may be any value of 2 or greater and in some embodiments any value of 5 or greater and in further embodiments the average value of n is 10 or greater. A person of ordinary skill in the art will recognize that additional ranges of average n values are contemplated and are within the present disclosure.

The polymeric charge transport composition of Formula (I) can be formed from a charge transport material with the formula:

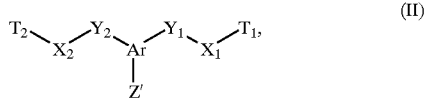

(II)

where $Y_1$ and $Y_2$ are, each independently, a bond, a —$CR_1$=N—$NR_2$— group, or a —$CR_3$=N—N=$CR_4$— group where $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group, such as a bond or a —$(CH_2)_m$— group, where m is an integer between 0 and 20, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group;

$T_1$ comprises a thiiranyl group;

$T_2$ comprises a thiiranyl group, H, an alkyl group, an alkenyl group, or an aromatic group;

Ar comprises an aromatic group; and

Z' comprises a reactive functional group that can covalently bond with a thiiranyl group.

In some embodiments, the thiiranyl group may have the following formula:

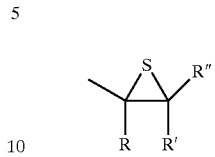

where R, R', and R" are, each independently, H, an alkyl group, an alkenyl group, a heterocyclic group, an aromatic group (e.g. phenyl, naphthyl, carbazolyl, stilbenyl), or a part of a ring group.

In some embodiments, the reactive functional group Z' is selected from the group consisting of a hydroxyl group, a carboxyl group, an amino group, and a thiol group. In principle, compounds represented by Formula (II) can be used as charge transport materials, but the polymerized form, represented by Formula (I), generally would be expected to be less extractable by carrier liquids in liquid toners. In forming the polymer, the Z' group and the $T_1$ thirranyl group react with each other to form a bonded functional group, —Z—C(SH)R—CR'R"—. The bonded functional group can be parsed out in a reasonable way using chemical convention into a —Z— group and a —C(SH)R—CR'R"— group of Formula (I).

Non-limiting examples of suitable monomers of Formula (II) include the following formulae:

(1)

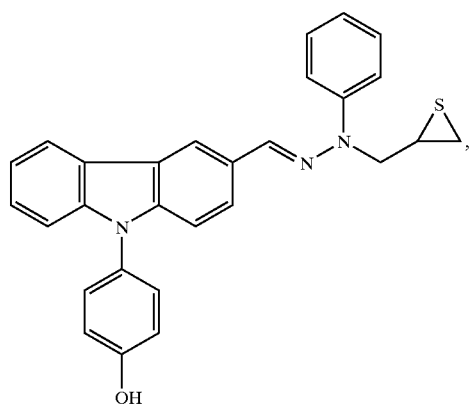

(2)

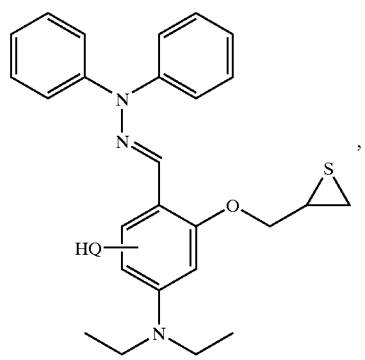

(3)

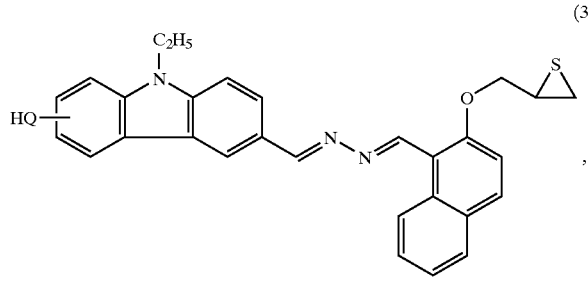

(4)

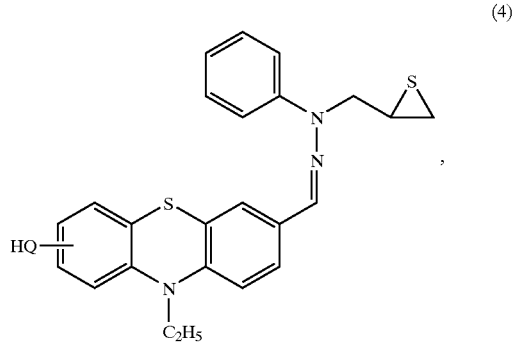

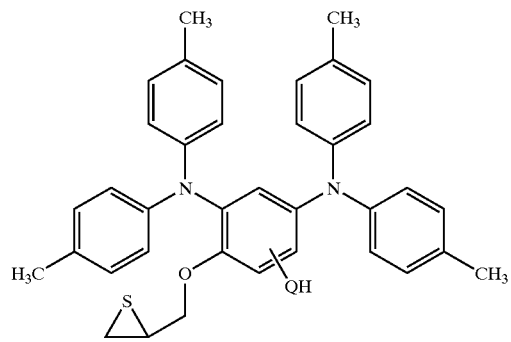 (5)

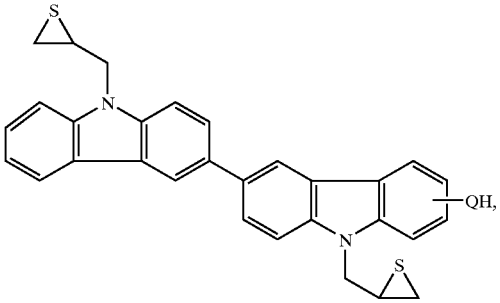 (6)

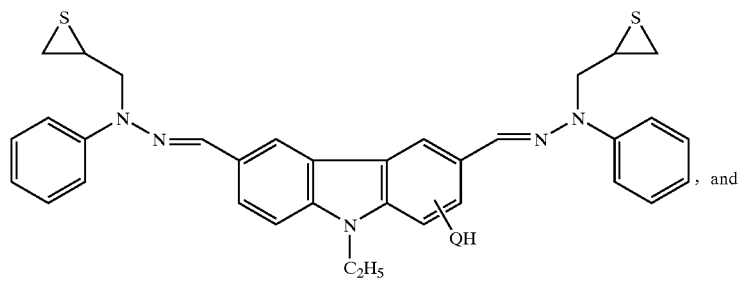 (7)

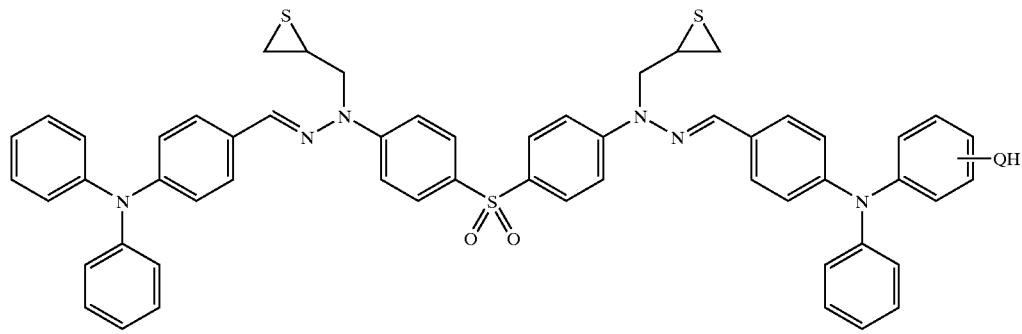 (8)

where Q is O, S, an NR$_5$ group, or a CO$_2$ group where R$_5$ is H, an alkyl group, an alkenyl group, or an aromatic group.

Synthesis of Charge Transport Compositions

Synthesis of the polymeric charge transport compositions generally involves two stages. The first stage is the formation of the polymerizable charge transport materials of Formula (II) and the second stage is the polymerization of the polymerizable charge transport materials to form the polymeric charge transport compositions of Formula (I).

A. Precursors for Charge Transport Materials of Formula (II)

Some charge transport materials of Formula (II) are aromatic hydrozone compounds or azine compounds. A hydrazone compound can be prepared by the reaction of an aromatic aldehyde or ketone with a suitable hydrazine derivative. An azine compound can be prepared by the reaction of a first aromatic aldehyde or ketone with hydrazine to form an aromatic hydrazone having a free NH$_2$ group. The free NH$_2$ group can then react with the first aromatic aldehyde or ketone, or a second aromatic aldehyde or ketone to form the corresponding azine compound.

Some charge transport materials, such as Compound (5) and Compound (6), of Formula (II) do not include a hydrazone group or azine group, the corresponding aromatic compounds with 2 reactive functional groups, which may be the same or different, are used as the precursors.

I. Hydrazines

Many hydrazine derivatives, such as (N,N-diphenyl)hydrazine, (N-methyl-N-phenyl)hydrazine, (N,N-diethyl)hydrazine, and (N,N-dimethyl)hydrazine, are suitable to form derivatized monomer compounds. They are available from commercial suppliers such as Aldrich. Some dimeric hydrazones are described in U.S. Pat. Nos. 6,140,004 and 6,670,085, incorporated herein by reference. The syntheses of other suitable hydrazine derivative are described as follows.

1,1-Dinaphthylhydrazine 1,1-Dinaphthylhydrazine can be prepared according to the procedure described in Staschkow, L. I.; Matevosyan, R. O. Journal of the General Chemistry (1964) 34, 136, which is incorporated herein by reference. A suspension of 0.07 mole of the naphthyl nitrosamine in 750 ml of ether is cooled to 5–8° C. and treated with 150 g of zinc dust. Acetic acid (70 ml) is then added drop-wise with stirring. To complete the reaction, 40 g of zinc dust is added. The reaction mixture is heated and filtered from the sludge. The mother liquor is washed with 10% sodium carbonate solution and dried with solid potassium hydroxide (KOH). The ether is distilled off to give the crystalline hydrazine, which is recrystallized from ethanol or butanol. Other symmetric disubstituted hydrazines can be synthesized based on an equivalent process.

N-Phenyl-N-sulfolan-3-ylhydrazine

N-Phenyl-N-sulfolan-3-ylhydrazine can be prepared according to the procedure described in Great Britain Patent No. 1,047,525 by Mason, which is incorporated herein by reference. To a mixture of 0.5 mole of butadiene sulfone (commercially available from Aldrich, Milwaukee, Wis.) and 0.55 mole of phenylhydrazine (commercially available from Aldrich, Milwaukee, Wis.) was added 0.005 mole 40% aqueous potassium hydroxide solution. The mixture was kept for 2 hours at 60° C. whereupon a solid separated. After 10 hours the solid was filtered off to give N-phenyl-N-sulfolan-3-ylhydrazine (53%) having a melting point of 120–121° C. (recrystallized from methanol).

4-Methylsulfonylphenylhydrazine (Registry Number 877-66-7)

4-Methylsulfonylphenylhydrazine is commercially available from Fisher Scientific USA, Pittsburgh, Pa. (1-800-766-7000).

1,1'-(Sulfonyldi-4,1-phenylene)bishydrazine (Registry Number 14052-65-4)

1,1'-(Sulfonyldi-4,1-phenylene)bishydrazine dihydrochloride is commercially available from Vitas-M, Moscow, Russia; (Phone: +7 (095) 939-5737)

II. Arylaldehydes/Ketone

Representative arylaldehydes for reacting with a hydrazine or hydrazine derivative to form hydrazones can be obtained as follows, and similar ketones can also be used. These arylaldehydes can be derivatized to form the Z' functional group bonded to the aromatic Ar group of Formula (II). One prophetic example for the synthesis of compound (1) above is described in detail below.

Synthesis of Julolidine Aldehyde

Julolidine (100 g, 0.6 moles, commercially obtained from Aldrich Chemicals Co, Milwaukee, Wis. 53201) was dissolved in dimethylformamide (DMF) (200 ml, commercially obtained from Aldrich) in a 500 ml three neck round bottom flask. The flask was cooled to 0° C. in ice bath. Phosphorus oxychloride ($POCl_3$) (107 g, 0.7 mole, Aldrich) was added drop wise while keeping the temperature below 5° C. After the addition of $POCl_3$ was completed, the flask was warmed to room temperature and placed in a steam bath while stirring for a period of 1 hour. The flask was cooled to room temperature and the solution was added slowly to a large excess of distilled water with good agitation. Stirring was continued for additional 2 hours. The solid was filtered off and washed repeatedly with water until the pH of the effluent water became neutral. The product was dried in vacuum oven at 50° C. for 4 hours.

Other Aryl Aldehydes

Suitable commercially available (N,N-disubstituted)arylamine aldehydes are available form Aldrich (Milwaukee, Wis.) including, for example, diphenylamino-benzaldehyde ($(C_6H_5)_2NC_6H_4CHO$) and 9-ethyl-3-carbazolecarboxyaldehyde.

B. Preparation of Charge Transport Materials of Formula (II)

The charge transport materials of Formula (II) can be prepared by the following multi-step synthetic procedures, although other suitable procedures can be used by a person of ordinary skill in the art based on the disclosure herein.

For the different procedures described below, the first step is always the synthesis of the epoxy analog of the targeted thiiranyl compound. The various preparation procedures of epoxy compounds have been disclosed in U.S. patent application Ser. Nos. 10/749,178, 10/634,164, 10/695,581, 10/663,970, and 10/692,389, and U.S. Provisional Patent Application Nos. 60/444,001 and 60/459,150. All the above application references are incorporated herein by reference. The above-mentioned preparation procedures are adapted for the preparations of epoxy compounds suitable as starting materials for the next step. In the next step, an epoxy compound reacts with ammonium thiocyanate in refluxing tetrahydrofuran to provide the corresponding thiiranyl compound having Formula (II). The thiiranyl compound can be isolated and purified by conventional purification techniques such as column chromatography and thin layer chromatography.

Specifically, some charge transport materials of Formula (II) can be prepared by reacting at least one aromatic aldehyde having a reactive functional group (e.g., a hydroxyl group, a thiol group, an amino group, and a carboxyl group) with a dihydrazine to form a dihydrazone. The dihydrazone can then react with an organic halide comprising an epoxy group to form the corresponding epoxy compound having a reactive functional group. Non-limiting examples of suitable organic halide comprising an epoxy group for this invention are epihalohydrins, such as epichlorohydrin. The organic halide comprising an epoxy group can also be prepared by the epoxidation reaction of the corresponding organic halide having an olefin group. The epoxidation reaction is described in Carey et al., "Advanced Organic Chemistry, Part B: Reactions and Synthesis," New York, 1983, pp. 494–498, incorporated herein by reference. The organic halide having an olefin group can also be prepared by the Wittig reaction between a suitable organic halide having an aldehyde or keto group and a suitable Wittig reagent. The Wittig and related reactions are described in Carey et al., "Advanced Organic Chemistry, Part B: Reactions and Synthesis," New York, 1983, pp. 69–77, incorporated herein by reference. The epoxy compound having a reactive functional group then reacts with ammonium thiocyanate in refluxing tetrahydrofuran (THF) to provide the corresponding thiiranyl compounds having Formula (II) where Z' comprises a hydroxyl group, a thiol group, an amino group, or a carboxyl group; $T_1$ and $T_2$ comprise, each independently, a thiiranyl group; $Y_1$ and $Y_2$ are, each independently, a hydrazone group; and Ar comprises an aromatic group.

Alternatively, some charge transport materials of Formula (II) can be prepared by reacting a bi-arylamine (e.g, 3,3-bicarbazole) having a reactive functional group (e.g., a hydroxyl group, a thiol group, an amino group, and a carboxyl group) with an organic halide comprising an epoxy group to form either a bi-arylamine having a reactive functional group and either one or two epoxy groups. The epoxy compound having a reactive functional group then reacts with ammonium thiocyanate in refluxing tetrahydrofuran (THF) to provide the corresponding thiiranyl compound having Formula (II) where Z' comprises a hydroxyl group, a thiol group, an amino group, or a carboxyl group; $T_1$ comprises a thiiranyl group, $Y_1$ and $Y_2$ are, each independently, a bond; and Ar comprises a bi-arylamine group, such as a 3,3-bicarbazole group.

Alternatively, some charge transport materials of Formula (II) can be prepared by reacting an aromatic aldehyde (e.g. triarylamine aldehyde and phenothiazine aldehyde) having a reactive functional group (e.g., a hydroxyl group, a thiol group, an amino group, and a carboxyl group) with an (N-substituted)hydrazine to form the corresponding (N-substituted)hydrazone having a reactive functional group. The (N-substituted)hydrazone having a reactive functional group then reacts with an organic halide comprising an epoxy group to form the corresponding epoxy compound having a reactive functional group. The epoxy compound having a reactive functional group then reacts with ammonium thiocyanate in refluxing tetrahydrofuran (THF) to provide the corresponding thiiranyl compound having Formula (II)

where Z' comprises a hydroxyl group, a thiol group, an amino group, or a carboxyl group; $T_1$ comprises a thiiranyl group; $Y_1$ is a hydrazone group; $T_2$ is H; $X_2$ and $Y_2$ are, each independently, a bond; and Ar comprises an aromatic group.

Alternatively, some charge transport materials of Formula (II) can be prepared by reacting an aromatic aldehyde with two reactive functional groups with an organic halide comprising an epoxy group in 1:1 molar ratio to form the corresponding aromatic aldehyde having an epoxy group and a reactive functional group. The product can be isolated from a mixture of compounds by column chromatography and/or other purification techniques known in the arts. Then the aromatic aldehyde having an epoxy group and a reactive functional group can react with an (N,N-disubstituted)hydrazine to form the corresponding epoxy compound having a reactive functional group. The epoxy compound having a reactive functional group then reacts with ammonium thiocyanate in refluxing tetrahydrofuran (THF) to provide the corresponding thiiranyl compound having Formula (II) where Z' comprises a hydroxyl group, a thiol group, an amino group, and a carboxyl group; $T_1$ comprises a thiiranyl group; $Y_2$ is a hydrazone group; $T_2$ is H; $X_2$ comprise an aromatic group; $Y_1$ is a bond; and Ar comprises an aromatic group.

Synthesis of Compound (1)

The following describes, as a prophetic example, the synthesis of Compound (1). Other desired monomers can be synthesized based on the teachings herein, both this prophetic example and the description above. The synthesis is described with six steps described in the following six reactions.

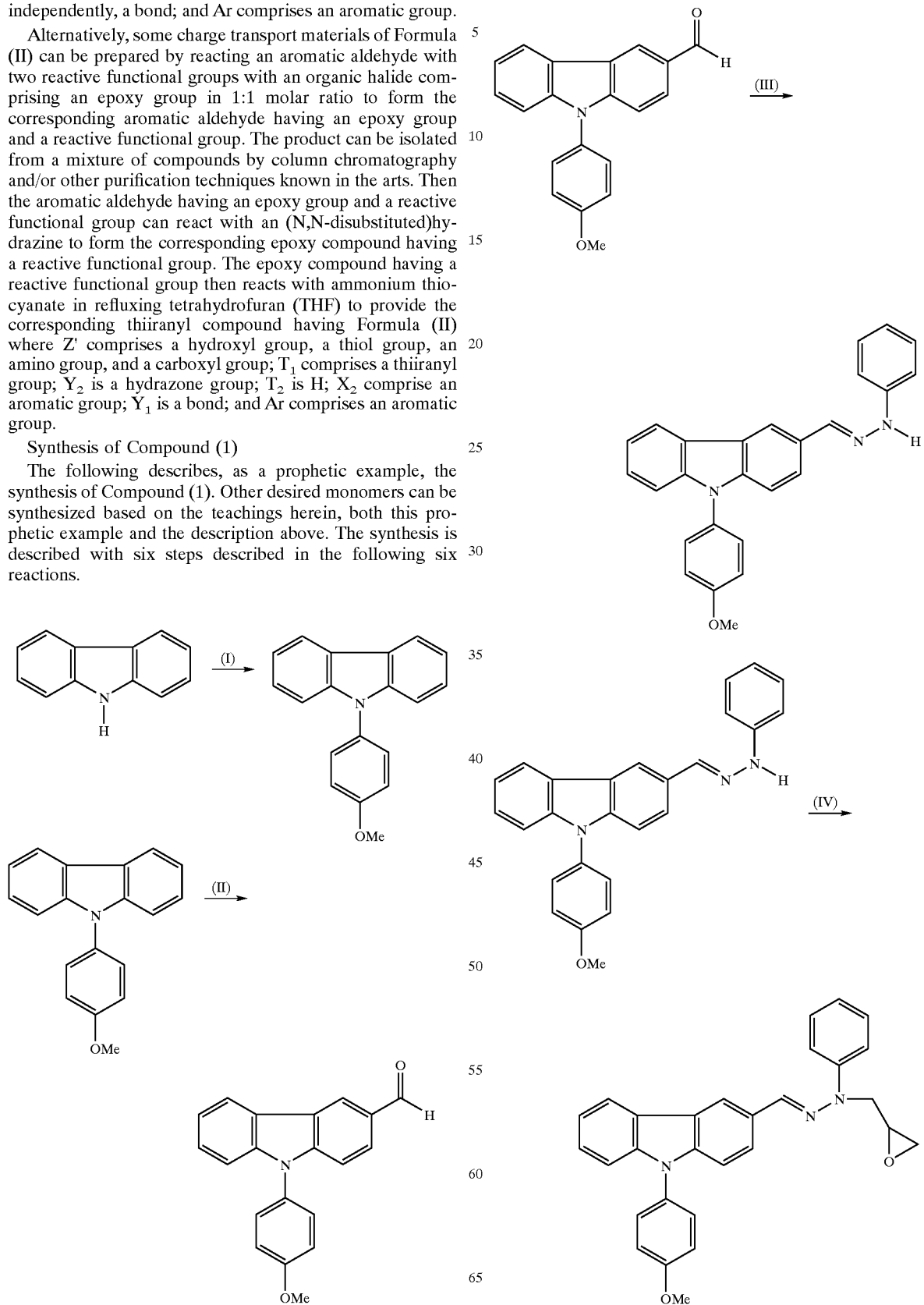

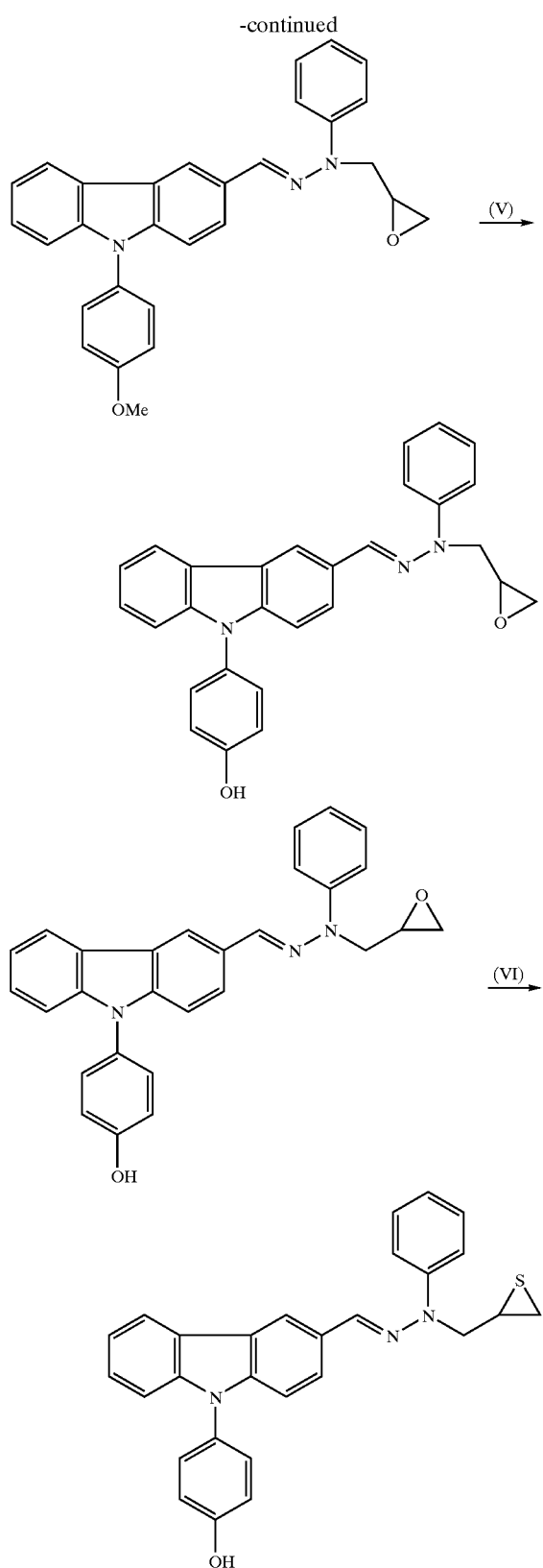

In step (I), carbazole (8.10 g, 48.5 mmole, Aldrich), 4-iodoanisole (12.4 g, 53.5 mmole, Aldrich), copper powder (0.38 g, 6.08 mmole, Aldrich), 18-crown-6-ether (4.28 g, 16.2 mmole, Aldrich), potassium carbonate (7.24 g, 53.4 mmole), 100 ml of o-dichlorobenzene can be added to a 500 ml three neck round bottom flask, equipped with a reflux condenser and a mechanical stirrer. The flask can be placed under dry nitrogen atmosphere and immersed in a silicone oil bath. The flask is then heated at 180° C. for 24 hours. After the reaction is completed, the solution is filtered hot to remove insoluble solids. The filtrate can be concentrated in an evaporator to obtain an oily product, which is added to 200 ml ethanol with stirring. The product can be obtained as a precipitate, which can be collected and recrystallized to obtain the product, which would be expected to be a white solid.

In step (II), dimethylformamide (DMF) is cooled in ice bath at 0° C. Phosphorous oxychloride is added slowly to the DMF while keeping the temperature below 5° C. The intermediate from step (I) is added, and the mixture is heated in a steam bath for 1 hour. The product solid can be isolated and purified.

In step (III), the intermediate from step (II) is dissolved in ethyl alcohol. A slight stochiometric excess of phenylhydrazine is added, and the mixture can be refluxed until thin layer chromatography (TLC) shows the disappearance of the starting material. A product solid can be isolated and recrystallized.

In step (IV), the intermediate from step (III) and epichlorohydrin are added to a 250 ml 3-neck round bottom flask equipped with a reflux condenser, a thermometer and a mechanical stirrer. The reaction mixture can be stirred vigorously at 35–40° C. for 24 h. Six periodically delivered portions of powdered 85% potassium hydroxide and anhydrous sodium sulphate can be added during the reaction time, and the reaction mixture is temporarily cooled to 20–25° C. prior to each addition. After termination of the reaction, the mixture is cooled to room temperature and filtered. The organic phase can be treated with ethyl acetate and washed with distilled water until the wash water is neutral. The organic layer is dried over anhydrous magnesium sulfate, treated with activated charcoal, and filtered. The solvent can then be removed. The residue can be subjected to column chromatography to purify the desired product.

In step (V), the intermediate from step (IV) can be dissolved in methylene chloride at 0° C. A 100 ml quantity of boron tribromide (1M) in methylene chloride can be added slowly while keeping the temperature at 0° C. The mixture can be stirred at 0° C. for 24 hours. Then, the mixture can be washed with distilled water. The washed organic solution can be evaporated to obtain the crude product. The crude product can be purified by recrystallization from a mixture of heptane and methylene chloride at a volume ratio of 8:1, respectively.

In step VI, the intermediate from step (V) (40.5 mmole), ammonium thiocyanate (10 g, 0.13 mole, obtained from Aldrich), and 40 ml of tetrahydrofuran (THF) may be added to a 100 ml, 3-neck round-bottom flask equipped with a reflux condenser and a magnetic stirrer. The mixture may be refluxed for 2 hours. The solvent is removed by evaporation, and the residue is subjected to liquid chromatography (using silica gel, grade 62, 60–200 mesh, 150 Angstrom, obtained from Aldrich) using a mixture of acetone and hexane in a 1:4 ratio by volume as eluant. Fractions containing the product are collected, and the solvent is evaporated. The residue may be recrystallized from benzene. The solid may be filtered off and washed with isopropanol.

C. Formation of the Charge Transport Composition

In general, the reaction conditions can be selected to polymerize the monomer units when it is desired to form the polymer. The degree of polymerization can be controlled by varying the reaction conditions, such as by the temperature, pH, solvent amount and/or the presence at a selected time and a selected concentration of a compound that terminated the polymerization reaction, such as a monofunctional alcohol.

In some embodiments, an optional crosslinking agent can be added initially or at a specific stage of the polymerization reaction to adjust the properties of the final polymeric charge transport compositions. Non-limiting examples of suitable include cyclic acid anhydrides, such as 1,8-naphthalene dicarboxylic acid anhydride, itaconic anhydride, glutaric anhydride, citraconic anhydride, fumaric anhydride, phthalic anhydride, isophthalic anhydride, terephthalic anhydride, and maleic anhydride.

As understood by those skilled in the art, additional substitution, variation among substituents, and alternative methods of synthesis and use may be practiced within the scope and intent of the present disclosure of the invention. The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

What is claimed is:

1. An organophotoreceptor comprising an electrically conductive substrate and a photoconductive element on the electrically conductive substrate, the photoconductive element comprising:

(a) a polymeric charge transport composition having the formula

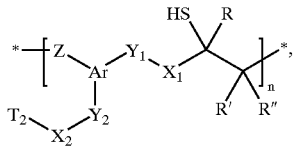

where $Y_1$ and $Y_2$ are, each independently, a bond, a —$CR_1$=N—$NR_2$— group, or a —$CR_3$=N—N=$CR_4$— group;

R, R', R'', $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group;

$T_2$ comprises a thiiranyl group, H, an alkyl group, an alkenyl group, or an aromatic group;

Ar comprises an aromatic group;

Z is a bridging group; and n is a distribution of integers between 1 and 100,000 with an average value of at least 2; and (b) a charge generating compound.

2. An organophotoreceptor according to claim 1 wherein $X_1$ and $X_2$ comprise, each independently, a bond or a —$(CH_2)_m$— group, where m is an integer between 1 and 30, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

3. An organophotoreceptor according to claim 1 wherein Z comprises a —$(CH_2)_k$— group, where k is an integer between 1 and 30, inclusive, and one or more of the methylene groups is optionally replaced by O, S, N, C, B, Si, P, C=O, O=S=O, a heterocyclic group, an aromatic group, an $NR_g$ group, a $CR_h$ group, a $CR_iR_j$ group, or a $SiR_kR_l$ where $R_g$, $R_h$, $R_i$, $R_j$, $R_k$, and $R_l$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

4. An organophotoreceptor according to claim 1 wherein Ar is selected from the group consisting of a carbazole group, a julolidine group, an (N,N-disubstituted)arylamine group, a bis[(N,N-disubstituted)amino]aromatic group, a bicarbazole group, a phenazine group, a phenothiazine group, a phenoxazine group, a phenoxathiine group, a dibenzo(1,4)dioxine group, and a thianthrene group.

5. An organophotoreceptor according to claim 1 wherein $X_2$ and $Y_2$ are, each independently, a bond and $T_2$ is H.

6. An organophotoreceptor according to claim 5 wherein Ar comprises an carbazole group, a julolidine group, an (N,N-disubstituted)arylamine group, a phenazine group, a phenothiazine group, a phenoxazine group, a phenoxathiine group, a dibenzo(1,4)dioxine group, or a thianthrene group; $X_1$ comprises a methylene group; $Y_1$ is a —$CR_1$=N—$NR_2$— group where $R_1$ and $R_2$ comprise, each independently, H, an alkyl group, an alkenyl group, a heterocyclic group, an aromatic group, or a part of a ring group; and Z is O, S, an $NR_5$ group, or a $CO_2$ group where $R_5$ is H, an alkyl group, an alkenyl group, or an aromatic group.

7. An organophotoreceptor according to claim 5 wherein Ar comprises a carbazole group, a julolidine group, or an (N,N-disubstituted)arylamine group; $Y_1$ is a —$CR_3$=N—N=$CR_4$— group where $R_3$ and $R_4$ comprise, each independently, H, an alkyl group, an alkenyl group, a heterocyclic group, an aromatic group, or a part of a ring group; $X_1$ is a —$(CH_2)_3$— group, where two of the methylene groups are replaced by O, and an aromatic group respectively; and Z is O, S, an NR5 group, or a $CO_2$ group where $R_5$ is H, an alkyl group, an alkenyl group, or an aromatic group.

8. An organophotoreceptor according to claim 1 wherein $X_2$ and $Y_1$ are, each independently, a bond; $Y_2$ is a —$CR_1$=N—$NR_2$— group where $R_1$ and $R_2$ comprise, each independently, H, an alkyl group, an alkenyl group, a heterocyclic group, an aromatic group, or a part of a ring group; $T_2$ is an aromatic group; $X_1$ is a —O—$CH_2$— group; Ar is an (N,N-disubstituted)arylamine group, a carbazole group, or a julolidine group; and Z is O, S, an $NR_5$ group, or a $CO_2$ group where $R_5$ is H, an alkyl group, an alkenyl group, or an aromatic group.

9. An organophotoreceptor according to claim 1 wherein $X_2$, $Y_1$ and $Y_2$ are, each independently, a bond; $T_2$ is H; Ar comprises a bis[(N,N-disubstituted)amino]aromatic group; $X_1$ is a —O—$CH_2$— group; and Z is O, S, an $NR_5$ group, or a $CO_2$ group where $R_5$ is H, an alkyl group, an alkenyl group, or an aromatic group.

10. An organophotoreceptor according to claim 1 wherein $Y_1$ and $Y_2$ are, each independently, a bond; $T_2$ is a thiiranyl group; $X_1$ and $X_2$ are, each independently, a —$CH_2$— group; Ar comprises a bicarbazole group; and Z is O, S, an $NR_5$ group, or a $CO_2$ group where $R_5$ is H, an alkyl group, an alkenyl group, or an aromatic group.

11. An organophotoreceptor according to claim 1 wherein the photoconductive element further comprises a second charge transport material.

12. An organophotoreceptor according to claim 11 wherein the second charge transport material comprises an electron transport compound.

13. An organophotoreceptor according to claim 1 wherein the photoconductive element further comprises a polymer binder.

14. An electrophotographic imaging apparatus comprising:
(a) a light imaging component; and
(b) an organophotoreceptor oriented to receive light from the light imaging component, the organophotoreceptor comprising an electrically conductive substrate and a photoconductive element on the electrically conductive substrate, the photoconductive element comprising:
(i) a polymeric charge transport composition having the formula

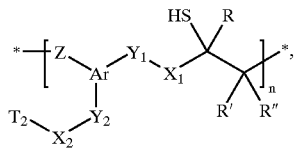

where $Y_1$ and $Y_2$ are, each independently, a bond, a $—CR_1=N—NR_2—$ group, or a $—CR_3=N—N=CR_4—$ group;
R, R', R", $R_1$, $R_2$, $R_3$, and $R_4$ comprise, each independently, H, an alkyl group, an alkenyl group, a heterocyclic group, an aromatic group, or a part of a ring group;
$X_1$ and $X_2$ are, each independently, a linking group;
$T_2$ comprises a thiiranyl group, H, an alkyl group, an alkenyl group, or an aromatic group;
Ar comprises an aromatic group;
Z is a bridging group; and
n is a distribution of integers between 1 and 100,000 with an average value at least 2; and
(ii) a charge generating compound.

15. An electrophotographic imaging apparatus according to claim 14 wherein $X_1$ and $X_2$ comprise, each independently, a bond or a $—(CH_2)_m—$ group, where m is an integer between 1 and 30, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

16. An electrophotographic imaging apparatus according to claim 14 wherein Z comprises a $—(CH_2)_k—$ group, where k is an integer between 1 and 30, inclusive, and one or more of the methylene groups is optionally replaced by O, S, N, C, B, Si, P, C=O, O=S=O, a heterocyclic group, an aromatic group, an $NR_g$ group, a $CR_h$ group, a $CR_iR_j$ group, or a $SiR_kR_l$ where $R_g$, $R_h$, $R_i$, $R_j$, $R_k$, and $R_l$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

17. An electrophotographic imaging apparatus according to claim 14 wherein Ar is selected from the group consisting of a carbazole group, a julolidine group, an (N,N-disubstituted)arylamine group, a bis[(N,N-disubstituted)amino]aromatic group, a bicarbazole group, a phenazine group, a phenothiazine group, a phenoxazine group, a phenoxathiine group, a dibenzo(1,4)dioxine group, and a thianthrene group.

18. An electrophotographic imaging apparatus according to claim 14 wherein the photoconductive element further comprises a second charge transport material.

19. An electrophotographic imaging apparatus according to claim 14 further comprising a toner dispenser.

20. An electrophotographic imaging process comprising:
(a) applying an electrical charge to a surface of an organophotoreceptor comprising an electrically conductive substrate and a photoconductive element on the electrically conductive substrate, the photoconductive element comprising:
(i) a polymeric charge transport composition having the formula

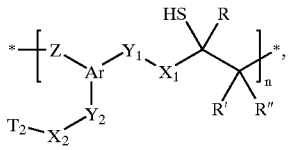

where $Y_1$ and $Y_2$ are, each independently, a bond, a $—CR_1=N—NR_2—$ group, or a $—CR_3=N—N=CR_4—$ group;
R, R', R", $R_1$, $R_2$, $R_3$, and $R_4$ comprise, each independently, H, an alkyl group, an alkenyl group, a heterocyclic group, an aromatic group, or a part of a ring group;
$X_1$ and $X_2$ are, each independently, a linking group;
$T_2$ comprises a thiiranyl group, H, an alkyl group, an alkenyl group, or an aromatic group;
Ar comprises an aromatic group;
Z is a bridging group; and
n is a distribution of integers between 1 and 100,000 with an average value at least 2; and
(ii) a charge generating compound;
(b) imagewise exposing the surface of the organophotoreceptor to radiation to dissipate charge in selected areas and thereby form a pattern of charged and uncharged areas on the surface;
(c) contacting the surface with a toner to create a toned image; and
(d) transferring the toned image to a substrate.

21. An electrophotographic imaging process according to claim 20 wherein $X_1$ and $X_2$ comprise, each independently, a bond or a $—(CH_2)_m—$ group, where m is an integer between 1 and 30, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

22. An electrophotographic imaging process according to claim 20 wherein Z comprises a $—(CH_2)_k—$ group, where k is an integer between 1 and 30, inclusive, and one or more of the methylene groups is optionally replaced by O, S, N, C, B, Si, P, C=O, O=S=O, a heterocyclic group, an aromatic group, an $NR_g$ group, a $CR_h$ group, a $CR_iR_j$ group, or a $SiR_kR_l$ where $R_g$, $R_h$, $R_i$, $R_j$, $R_k$, and $R_l$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

23. An electrophotographic imaging process according to claim 20 wherein Ar is selected from the group consisting of a carbazole group, a julolidine group, an (N,N-disubstituted) arylamine group, a bis[(N,N-disubstituted)amino]aromatic group, a bicarbazole group, a phenazine group, a phenothiazine group, a phenoxazine group, a phenoxathiine group, a dibenzo(1,4)dioxine group, and a thianthrene group.

24. An electrophotographic imaging process according to claim 20 wherein the photoconductive element further comprises a second charge transport material.

25. An electrophotographic imaging process according to claim 20 wherein the photoconductive element further comprises a polymer binder.

26. A polymeric charge transport composition having the formula:

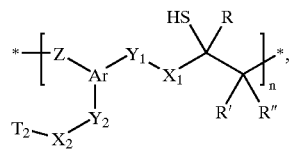

where $Y_1$ and $Y_2$ are, each independently, a bond, a —$CR_1$=N—$NR_2$— group, or a —$CR_3$=N—N=$CR_4$— group;

R, R', R'', $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group;

$T_2$ comprises a thiiranyl group, H, an alkyl group, an alkenyl group, or an aromatic group;

Ar comprises an aromatic group;

Z is a bridging group; and n is a distribution of integers between 1 and 100,000 with an average value at least 2.

27. A polymeric charge transport composition according to claim 26 wherein $X_1$ and $X_2$ comprise, each independently, a bond or a —$(CH_2)_m$— group, where m is an integer between 1 and 30, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

28. A polymeric charge transport composition according to claim 26 wherein Z comprises a —$(CH_2)_k$— group, where k is an integer between 1 and 30, inclusive, and one or more of the methylene groups is optionally replaced by O, S, N, C, B, Si, P, C=O, O=S=O, a heterocyclic group, an aromatic group, an $NR_g$ group, a $CR_h$ group, a $CR_iR_j$ group, or a $SiR_kR_l$ where $R_g$, $R_h$, $R_i$, $R_j$, $R_k$, and $R_l$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

29. A polymeric charge transport composition according to claim 26 wherein Ar is selected from the group consisting of a carbazole group, a julolidine group, an (N,N-disubstituted)arylamine group, a bis[(N,N-disubstituted)amino]aromatic group, a bicarbazole group, a phenazine group, a phenothiazine group, a phenoxazine group, a phenoxathiine group, a dibenzo(1,4)dioxine group, and a thianthrene group.

30. A charge transport material having the formula:

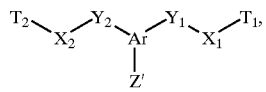

where $Y_1$ and $Y_2$ are, each independently, a bond, a —$CR_1$=N—$NR_2$— group, or a —$CR_3$=N—N=$CR_4$— group where $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group;

$T_1$ comprises a thiiranyl group;

$T_2$ comprises a thiiranyl group, H, an alkyl group, an alkenyl group, or an aromatic group;

Ar comprises an aromatic group; and

Z' comprises a reactive functional group that can covalently bond with the thiiranyl group under appropriate reaction conditions.

31. A charge transport material according to claim 30 wherein $X_1$ and $X_2$ comprise, each independently, a bond or a —$(CH_2)_m$— group, where m is an integer between 0 and 20, inclusive, and one or more of the methylene groups is optionally replaced by O, S, N, C, B, Si, P, C=O, O=S=O, a heterocyclic group, an aromatic group, an $NR_a$ group, a $CR_b$ group, a $CR_cR_d$ group, or a $SiR_eR_f$ where $R_a$, $R_b$, $R_c$, $R_d$, $R_e$, and $R_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

32. A charge transport material according to claim 30 wherein Z' is selected from the group consisting of a hydroxyl group, a thiol group, an amino group, and a carboxyl group.

33. A charge transport material according to claim 30 wherein Ar is selected from the group consisting of a carbazole group, a julolidine group, an (N,N-disubstituted) arylamine group, a bis[(N,N-disubstituted)amino]aromatic group, a bicarbazole group, a phenazine group, a phenothiazine group, a phenoxazine group, a phenoxathiine group, a dibenzo(1,4)dioxine group, and a thianthrene group.

34. A method for forming a polymeric charge transport composition, the method comprising the step of polymerizing a charge transport material having the formula:

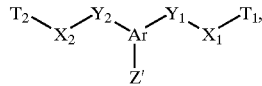

where $Y_1$ and $Y_2$ are, each independently, a bond, a —$CR_1$=N—$NR_2$— group, or a —$CR_3$=N—N=$CR_4$— group where $R_1$, $R_2$, $R_3$, and $R_4$ comprise, each independently, H, an alkyl group, an alkenyl group, a heterocyclic group, an aromatic group, or a part of a ring group;

$X_1$ and $X_2$ are, each independently, a linking group;

$T_1$ comprises a thiiranyl group;

$T_2$ comprises a thiiranyl group, H, an alkyl group, an alkenyl group, or an aromatic group;

Ar comprises an aromatic group; and

Z' comprises a reactive functional group that can covalently bond with the thiiranyl group under appropriate reaction conditions.

35. A method for forming a polymeric charge transport composition according to claim 34 wherein $X_1$ and $X_2$ comprise, each independently, a bond or a —(CH$_2$)$_m$— group, where m is an integer between 0 and 20, inclusive, and one or more of the methylene groups is optionally replaced by O, S, N, C, B, Si, P, C═O, O═S═O, a heterocyclic group, an aromatic group, an NR$_a$ group, a CR$_b$ group, a CR$_c$R$_d$ group, or a SiR$_e$R$_f$ where R$_a$, R$_b$, R$_c$, R$_d$, R$_e$, and R$_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

36. A method for forming a polymeric charge transport composition according to claim 34 wherein wherein Z' is selected from the group consisting of a hydroxyl group, a thiol group, an amino group, and a carboxyl group.

37. A method for forming a polymeric charge transport composition according to claim 34 wherein Ar is selected from the group consisting of a carbazole group, a julolidine group, an (N,N-disubstituted)arylamine group, a bis[(N,N-disubstituted)amino]aromatic group, a bicarbazole group, a phenazine group, a phenothiazine group, a phenoxazine group, a phenoxathiine group, a dibenzo(1,4)dioxine group, and a thianthrene group.

38. A method for forming a polymeric charge transport composition according to claim 34 wherein the polymerizing step is initiated by the adjustment of the pH, the temperature, the concentration, or a combination thereof.

39. A method for forming a polymeric charge transport composition, the method comprising the step of co-polymerizing an acid anhydride and a charge transport material having the formula:

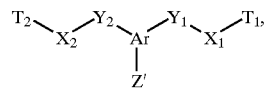

where $Y_1$ and $Y_2$ are, each independently, a bond, a —CR$_1$═N—NR$_2$— group, or a —CR$_3$═N—N═CR$_4$— group where R$_1$, R$_2$, R$_3$, and R$_4$ comprise, each independently, H, an alkyl group, an alkenyl group, a heterocyclic group, an aromatic group, or a part of a ring group;

$X_1$ and $X_2$ are, each independently, a linking group;

$T_1$ comprises a thiiranyl group;

$T_2$ comprises a thiiranyl group, H, an alkyl group, an alkenyl group, or an aromatic group;

Ar comprises an aromatic group; and

Z' comprises a reactive functional group that can covalently bond with the thiiranyl group under appropriate reaction conditions.

40. A method for forming a polymeric charge transport composition according to claim 39 wherein $X_1$ and $X_2$ comprise, each independently, a bond or a —(CH$_2$)$_m$— group, where m is an integer between 0 and 20, inclusive, and one or more of the methylene groups is optionally replaced by O, S, N, C, B, Si, P, C═O, O═S═O, a heterocyclic group, an aromatic group, an NR$_a$ group, a CR$_b$ group, a CR$_c$R$_d$ group, or a SiR$_e$R$_f$ where R$_a$, R$_b$, R$_c$, R$_d$, R$_e$, and R$_f$ are, each independently, a bond, H, a hydroxyl group, a thiol group, a carboxyl group, an amino group, an alkyl group, an alkoxy group, an alkenyl group, a heterocyclic group, an aromatic group, or part of a ring group.

41. A method for forming a polymeric charge transport composition according to claim 39 wherein wherein Z' is selected from the group consisting of a hydroxyl group, a thiol group, an amino group, and a carboxyl group.

42. A method for forming a polymeric charge transport composition according to claim 39 wherein Ar is selected from the group consisting of a carbazole group, a julolidine group, an (N,N-disubstituted)arylamine group, a bis[(N,N-disubstituted)amino]aromatic group, a bicarbazole group, a phenazine group, a phenothiazine group, a phenoxazine group, a phenoxathiine group, a dibenzo(1,4)dioxine group, and a thianthrene group.

* * * * *